United States Patent
Chang et al.

(10) Patent No.: US 8,248,987 B2
(45) Date of Patent: Aug. 21, 2012

(54) APPARATUS AND METHOD FOR ACK CHANNEL TRANSMISSION IN WIRELESS RELAY COMMUNICATION SYSTEM

(75) Inventors: Young-Bin Chang, Anyang-si (KR); Rakesh Taori, Suwon-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 12/267,420

(22) Filed: Nov. 7, 2008

(65) Prior Publication Data

US 2009/0122746 A1 May 14, 2009

(30) Foreign Application Priority Data

Nov. 8, 2007 (KR) .................. 10-2007-0113766

(51) Int. Cl.
*H04B 7/14* (2006.01)
*H04W 72/04* (2009.01)
*H04L 1/18* (2006.01)

(52) U.S. Cl. ........ 370/315; 370/329; 370/252; 714/749; 455/13.1

(58) Field of Classification Search .................. 370/315, 370/329, 328, 312, 390, 338, 236; 714/748–750, 714/E11.13; 455/422.1, 11.1, 13.1
See application file for complete search history.

(56) References Cited

U.S. PATENT DOCUMENTS

| | | | |
|---|---|---|---|
| 5,898,679 A * | 4/1999 | Brederveld et al. .......... 370/315 |
| 7,599,363 B2 | 10/2009 | Jang et al. | |
| 7,974,229 B2 * | 7/2011 | Jones et al. ................... 370/315 |
| 2007/0298778 A1 * | 12/2007 | Chion et al. ............... 455/422.1 |
| 2008/0056173 A1 * | 3/2008 | Watanabe .................... 370/315 |
| 2008/0109299 A1 * | 5/2008 | Khetarpal et al. ............. 705/11 |
| 2008/0247349 A1 * | 10/2008 | Hsieh et al. ................... 370/315 |
| 2008/0279145 A1 * | 11/2008 | Boariu et al. ................. 370/329 |
| 2008/0282126 A1 * | 11/2008 | Chindapol et al. ........... 714/748 |
| 2009/0010198 A1 * | 1/2009 | Boariu et al. ................. 370/315 |
| 2009/0141676 A1 * | 6/2009 | Maheshwari et al. ........ 370/329 |

FOREIGN PATENT DOCUMENTS

| | | |
|---|---|---|
| JP | 2006-54897 A | 2/2006 |
| JP | 2006-66948 A | 3/2006 |
| WO | 2005/088886 A1 | 9/2005 |
| WO | 2006/001658 A1 | 1/2006 |
| WO | 2006/071049 A1 | 7/2006 |
| WO | 2008/129677 A1 | 10/2008 |

* cited by examiner

*Primary Examiner* — Kwang B Yao
*Assistant Examiner* — Candal Elpenord
(74) *Attorney, Agent, or Firm* — Jefferson IP Law, LLP

(57) ABSTRACT

An apparatus and a method for transmitting ACKnowledge (ACK) channels by a Relay Station (RS) in a wireless communication system are provided. The method includes, when receiving one or more ACK information from one or more lower nodes, checking ACK channel constitution information provided from an upper node, arranging one or more ACK channels to transmit corresponding ACK information according to the ACK channel constitution information by distinguishing ACK information of one or more data scheduled by the upper node and ACK information of one or more retransmission data not scheduled by the upper node, and transmitting the one or more ACK information to the upper node in the arranged ACK channels.

22 Claims, 5 Drawing Sheets

APPARATUS AND METHOD FOR ACK CHANNEL TRANSMISSION IN WIRELESS RELAY COMMUNICATION SYSTEM

PRIORITY

This application claims the benefit under 35 U.S.C. §119 (a) of a Korean patent application filed in the Korean Intellectual Property Office on Nov. 8, 2007 and assigned Serial No. 10-2007-0113766, the entire disclosure of which is hereby incorporated by reference.

BACKGROUND OF THE INVENTION

1. Field of the Invention

The present invention relates to an apparatus and a method for Automatic Repeat reQuest (ARQ) in a wireless communication system. More particularly, the present invention relates to an apparatus and a method for transmitting ACKnowledge (ACK) channels for ARQ in a wireless relay communication system.

2. Description of the Related Art

Wireless communications systems are subject to error in transmission data depending on a status of a radio channel. To control and recover the data error, the wireless communications systems employ an Automatic Repeat reQuest (ARQ) scheme or a Forward Error Correction (FEC) scheme. Herein, according to the ARQ scheme, a receiver requests a transmitter to retransmit the corrupted data. According to the FEC scheme, the receiver corrects the data error.

Using the ARQ scheme, the receiver sends error information of a packet received from the transmitter, to the transmitter. That is, when the received packet is free from error, the receiver sends an Acknowledge (ACK) signal to the transmitter. In contrast, when the received packet is corrupted, the receiver sends a Negative ACK (NACK) signal to the transmitter.

When receiving the ACK signal from the receiver, the transmitter transmits a new packet. When receiving the NACK signal from the receiver, the transmitter retransmits the data to the receiver in response to the NACK signal.

The wireless communications systems provide a relay service using a Relay Station (RS) in order to provide a better radio channel to a Mobile Station (MS) traveling in a cell boundary or in a shadow area. More specifically, the wireless relay communication system can provide a better radio channel between a Base Station (BS) and the MS by relaying data transmitted and received between the BS and the MS via the RS.

The BS, the RS, and the MS in the wireless relay communication system transmit and receive data over radio channels. In this respect, what is needed is an ARQ method for controlling and recovering data error in consideration of the RS in the wireless relay communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for transmitting a plurality of Acknowledge (ACK) channels to an upper node at the same time at a Relay Station (RS) of a wireless relay communication system.

Another aspect of the present invention is to provide an apparatus and a method for arranging a plurality of ACK channels in an order based on ACK channel scheduling information provided from an upper node and transmitting the ACK channels to the upper node at an RS of a wireless relay communication system.

Yet another aspect of the present invention is to provide an apparatus and a method for transmitting an ACK channel of data scheduled by an upper node and an ACK channel of retransmission data unscheduled by the upper node, to the upper node at the same time at an RS of a wireless relay communication system.

Still another aspect of the present invention is to provide an apparatus and a method for distinguishing and transmitting an ACK channel of data scheduled by an upper node and an ACK channel of retransmission data unscheduled by the upper node, to the upper node at an RS of a wireless relay communication system.

The above aspects are addressed by providing a method for transmitting an ACK channel at an RS in a wireless relay communication system. The method includes, when receiving one or more ACK information from one or more lower nodes, checking ACK channel constitution information provided from an upper node, arranging one or more ACK channels to transmit the one or more ACK information according to the ACK channel constitution information by distinguishing ACK information of one or more data scheduled by the upper node and ACK information of one or more retransmission data not scheduled by the upper node, and transmitting the one or more ACK information to the upper node in the arranged ACK channels.

According to one aspect of the present invention, an apparatus for an RS in a wireless relay communication system is provided. The apparatus includes a receiving part for receiving a signal, an ACKnowledge (ACK) channel constitutor for, when receiving one or more ACK information from one or more lower nodes through the receiving part, detecting ACK channel constitution information provided from an upper node, and a transmitting part for arranging one or more ACK channels to transmit the one or more ACK information according to the ACK channel constitution information by distinguishing ACK information of one or more data scheduled by the upper node and ACK information of one or more retransmission data not scheduled by the upper node, and for transmitting the one or more ACK information to the upper node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for a Relay Station (RS) to simultaneously transmit a plurality of ACKnowledge (ACK) channels to an upper node in a wireless relay communication system. Herein, the upper node represents a Base Station (BS) or an upper RS.

Herein, the wireless communication system is assumed to adopt Automatic Repeat reQuest (ARQ). An RS away from the BS by N hops is referred to as an RS N. A Mobile Station (MS) serviced by the RS N is referred to as an MS N.

It is assumed that the wireless communication system utilizes a centralized scheduling scheme. That is, the BS schedules all of the lower nodes and controls the ARQ. For doing so, the BS receives ACK information corresponding to data sent to the lower nodes. Herein, the ACK information indicates an ACK signal or a Negative ACK (NACK) signal sent from the lower node to the upper node over the ACK channel. The lower node represents a lower RS or an MS.

Figure 1:
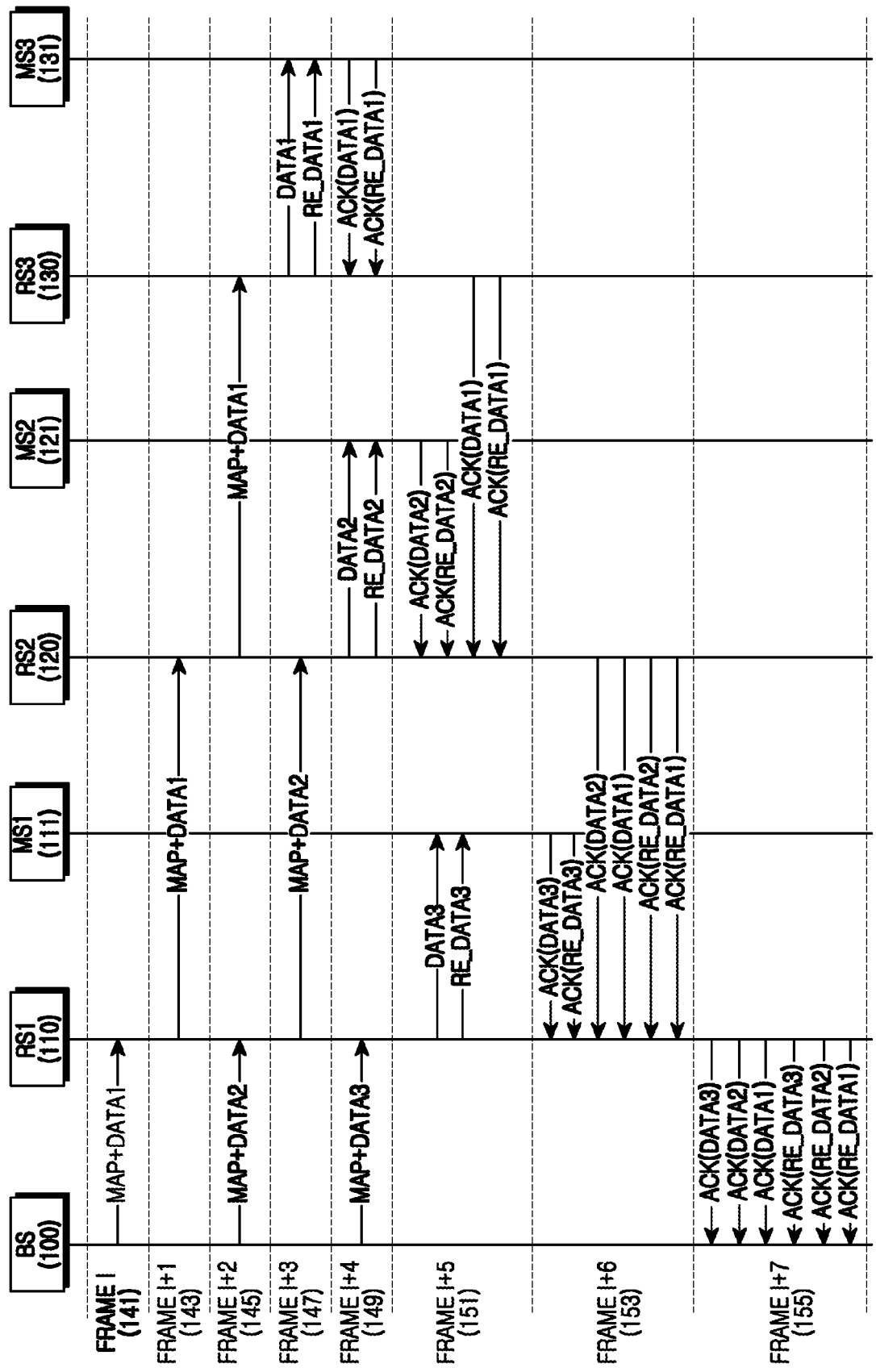
FIG. 1 illustrates a structure for sending ACKnowledge (ACK) channels for Automatic Repeat reQuest (ARQ) in a wireless relay communication system according to an exemplary embodiment of the present invention.

FIG. 1 illustrates a structure for transmitting ACK channels for the ARQ in a wireless relay communication system according to an exemplary embodiment of the present invention.

The wireless communication system of FIG. 1 includes a BS 100, a first RS (RS1) 110, a second RS (RS2) 120, a third RS (RS3) 130, a first MS (MS1) 111, a second MS (MS2) 121 and a third MS (MS3) 131.

In the i-th frame (FRAME I) 141, the BS 100 transmits first data (DATA1) destined for the third MS 131 and a MAP including scheduling information to the first RS 110. Herein, the MAP includes the scheduling information for the data transmission and the data retransmission, and ACK channel region information for the lower node to send the ACK channels.

In the (i+1)-th frame (FRAME I+1) 143, the first RS 110 forwards the first data and the MAP received from the BS 100, to the second RS 120.

In the (i+2)-th frame (FRAME I+2) 145, the BS 100 transmits second data (DATA2) destined for the second MS 121 and a MAP including scheduling information to the first RS 110.

In addition, the second RS 120 forwards the first data and the MAP received from the first RS 110, to the third RS 130.

In the (i+3)-th frame (FRAME I+3) 147, the first RS 110 forwards the second data and the MAP received from the BS 110, to the second RS 120.

In addition, the third RS 130 forwards the first data to the third MS 131 according to the scheduling information provided from the second RS 120. In doing so, the third RS 130 sends first retransmission data (RE_DATA1) to the third MS 131 together with the first data without the scheduling of the upper node. Herein, the first retransmission data indicates data retransmitted from the third RS 130 to the third MS 131 because of error in the data transmitted from the third RS 130 to the third MS 131 in the previous frame.

In step (i+4)-th frame (FRAME I+4) 149, the BS 100 transmits third data (DATA3) destined for the first MS 111 and a MAP including scheduling information, to the first RS 110.

In addition, the second RS 120 forwards the second data to the second MS 121 according to the scheduling information provided from the first RS 110. In doing so, the second RS 120 transmits second retransmission data (RE_DATA2) to the second MS 121 together with the second data without the scheduling of the upper node. Herein, the second retransmission data indicates data retransmitted from the second RS 120 to the second MS 121 because of error in the data transmitted from the second RS 120 to the second MS 121 in the previous frame.

The third MS 131 transmits ACK information relating to the first data (ACK(DATA1))and the first retransmission data (ACK(RE_DATA1)) received from the third RS 130 in the (i+3)-th frame 147, to the third RS 130.

In the (i+5)-th frame (FRAME I+5) 151, the first RS 110 forwards the third data and the MAP received from the BS 100, to the first MS 111.

The second MS 121 transmits ACK information relating to the second data (ACK(DATA2)) and the second retransmission data (ACK(RE_DATA2)) received from the second RS 120 in the (i+4)-th frame 149, to the second RS 120.

The third RS 130 forwards the ACK information received from the third MS 131 in the (i+4)-th frame 149, to the second RS 120.

When transmitting the ACK information to the second RS 120, the third RS 130 separates the ACK information of the first data scheduled from the upper node and the ACK information of the first retransmission data transmitted without the scheduling of the upper node.

In the (i+6)-th fame (FRAME I+6) 153, the first MS 111 transmits ACK information relating to the third data (ACK (DATA3)) and the third retransmission data (ACK(RE_ DATA3)) received from the first RS 110 in the (i+5)-th frame 151, to the first RS 110.

The second RS 120 forwards the ACK information received from the second MS 121 and the ACK information received from the third RS 130 in the (i+5)-th frame 151, to the first RS 110. When transmitting the ACK information to the first RS 110, the second RS 120 separates the ACK information of the first data and the second data scheduled by the upper node and the ACK information of the first retransmission data and the second retransmission data transmitted without the scheduling of the upper node.

In the (i+7)-th frame (FRAME I+7) 155, the first RS 110 relays the ACK information received from the first MS 111 and the ACK information received from the second RS 120 in the (i+6)-th frame 153, to the BS 100. When relaying the ACK information to the BS 100, the first RS 110 separates the ACK information of the first data, the second data, and the third data scheduled by the upper node, and the ACK information of the first retransmission data, the second retransmission data, and the third retransmission data unscheduled by the upper node.

As described above, the RS forwards the ACK information from the MS to the upper node. The RS relays the ACK information received from the MS to the upper node using the ACK information transmission time provided from the BS and the ACK channel provided from the upper node. For example, when the BS 100 controls to send the ACK information of the first data, the second data, and the third data in the (i+7)-th frame 155 as shown in FIG. 1, the first RS 100 forwards the ACK information of the first data, the second data, and the third data to the BS 100 over the (i+7)-th frame 155.

Over the ACK channel provided from the upper node, the RS transmits not only the ACK information from its servicing MS but also the ACK information from the upper RS, to the upper node. For example, the second RS 120 relays the ACK information received from the second MS 121 and the ACK information received from the third RS 130 to the first RS 110 over the (i+6)-th frame 153 as illustrated in FIG. 1. The first RS 110 relays the ACK information from the first MS 111 and the ACK information from the second RS 120 to the BS 100 over the (i+7)-th frame 155. In doing so, the first RS 110 forwards the ACK information from the lower nodes to the BS 100 according to the ACK information transmission time provided from the BS 100.

As described above, the RS can send the plurality of the ACK information to the upper node over the respective ACK channels at the same time. To transmit the multiple ACK information to the upper node in the order agreed with the upper node, the RS arranges the ACK channels. For instance, at the system configuration phase, the RS agrees with the upper node on the arrangement order of the ACK channels to be transmitted to the upper node. Alternatively, the upper node transmits the arrangement order of the ACK channels to the lower RS using a control message.

The RS can determine the order of the ACK channels by taking into account the MAP reception order or the number of hops to the node which originally transmitted the ACK information.

First, based on the MAP reception order, the first RS 110 of FIG. 1 sequentially receives the MAP of the first data, the MAP of the second data, and the MAP of the third data from the BS 100. The first RS 110 arranges a plurality of ACK channels in order of the first data, the second data, and the third data as illustrated in channel arrangement A in FIG. 5, and transmits the ACK information to the BS 100.

Figure 5:
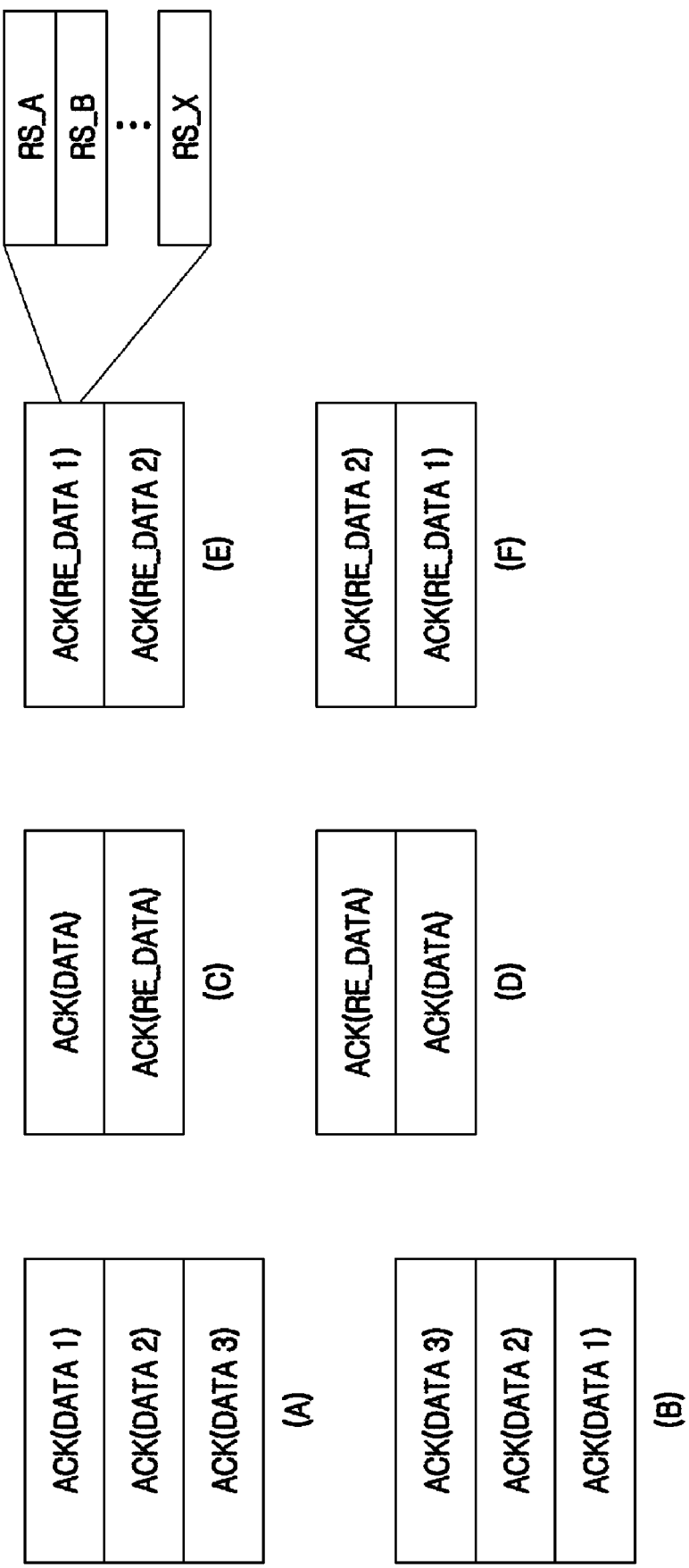
FIG. 5 illustrates ACK channel structures transmitted by an RS in a wireless relay communication system according to exemplary embodiments of the present invention.

FIG. 5 illustrates ACK channel structures transmitted by an RS in a wireless communication system according to exemplary embodiments of the present invention Alternatively, the first RS 110 may constitute a plurality of ACK channels in order of the third data, the second data, and the first data as illustrated in channel arrangement B in FIG. 5 and may transmit the ACK information to the BS 100.

Next, based on the number of hops to the node which originally transmitted the ACK information, the third MS 131 which originally sent the ACK information of the first data is three hops away from the first RS 110, the second MS 121 which originally sent the ACK information of the second data is two hops away from the first RS 110, and the first MS 111 which originally sent the ACK information of the third data is one hop away from the first RS 110 as illustrated in FIG. 1. Thus, the first RS 110 configures the ACK channels in order of the first data, the second data, and the third data as illustrated in channel arrangement A in FIG. 5 and transmits the plurality of the ACK information to the BS 100. Alternatively, the first RS 110 configures the ACK channels in order of the third data, the second data, and the first data as illustrated in channel arrangement B in FIG. 5 and transmits the plurality of the ACK information to the BS 100.

Similar to the first RS 110, the second RS 120 in FIG. 1 can constitute the ACK channels in consideration of the MAP reception order or the number of hops to the node which originally sent the ACK information.

As described above, the RS relays the ACK information received from the lower nodes to the upper node. In so doing, the RS forwards the ACK information of not only the data scheduled by the upper node but also the retransmission data not scheduled by the upper node.

When the retransmission data is sent to the lower node without the scheduling of the upper node, the upper node does not know when the lower RS sends the retransmission data and when the lower RS relays the ACK information of the retransmission data.

In this respect, in allocating the ACK channel regions to the lower nodes, the BS allocates not only the ACK channel region for the data transmitted to the lower node but also the ACK channel region for the retransmission data arbitrarily sent by the lower RSs. In doing so, the BS separates the ACK channel region for the data scheduled by the BS and the ACK channel region for the retransmission data arbitrarily sent by the lower RS.

The RS separately transmits the ACK channel for the ACK information of the data scheduled by the upper node and the ACK channel for the retransmission data sent to the lower node without the scheduling of the upper node. For example, the RS allocates first the ACK channel for the data scheduled by the upper node and then the ACK channel for the retransmission data not scheduled as illustrated in channel arrangement C in FIG. 5. Alternatively, the RS may allocate the ACK channel for the unscheduled retransmission data and then the ACK channel for the data scheduled by the upper node as illustrated in channel arrangement D in FIG. 5.

The ACK channel region for the data scheduled by the BS can be configured as illustrated in channel arrangement A or B in FIG. 5. The RS can sequentially configure and transmit the ACK channel regions for the retransmission data sent without the scheduling of the upper node. For example, the RS allocates the ACK channel for the ACK information received from the lower RS and then the ACK channel for the ACK information received from the MS as illustrated in channel arrangement E in FIG. 5. Alternatively, the RS may allocate the ACK channel for the ACK information received from the MS and then the ACK channel for the ACK information received from the lower RS as illustrated in channel arrangement F in FIG. 5. Alternatively, the RS may arrange a plurality of ACK channels based on the transmission order of ACK channel allocation control messages. Herein, the ACK channel allocation control message indicates an ACK allocation Information Element (IE) in the uplink MAP of the Institute of Electrical and Electronics Engineers (IEEE) 802.16 standard. Alternatively, the RS may arrange the ACK channels based on the reception order of the ACK channels for the retransmission data from the lower RSs directly connected.

Now, operations of the BS for allocating the ACK channels to the lower nodes for the ARQ in the wireless communications system are described.

Figure 2:
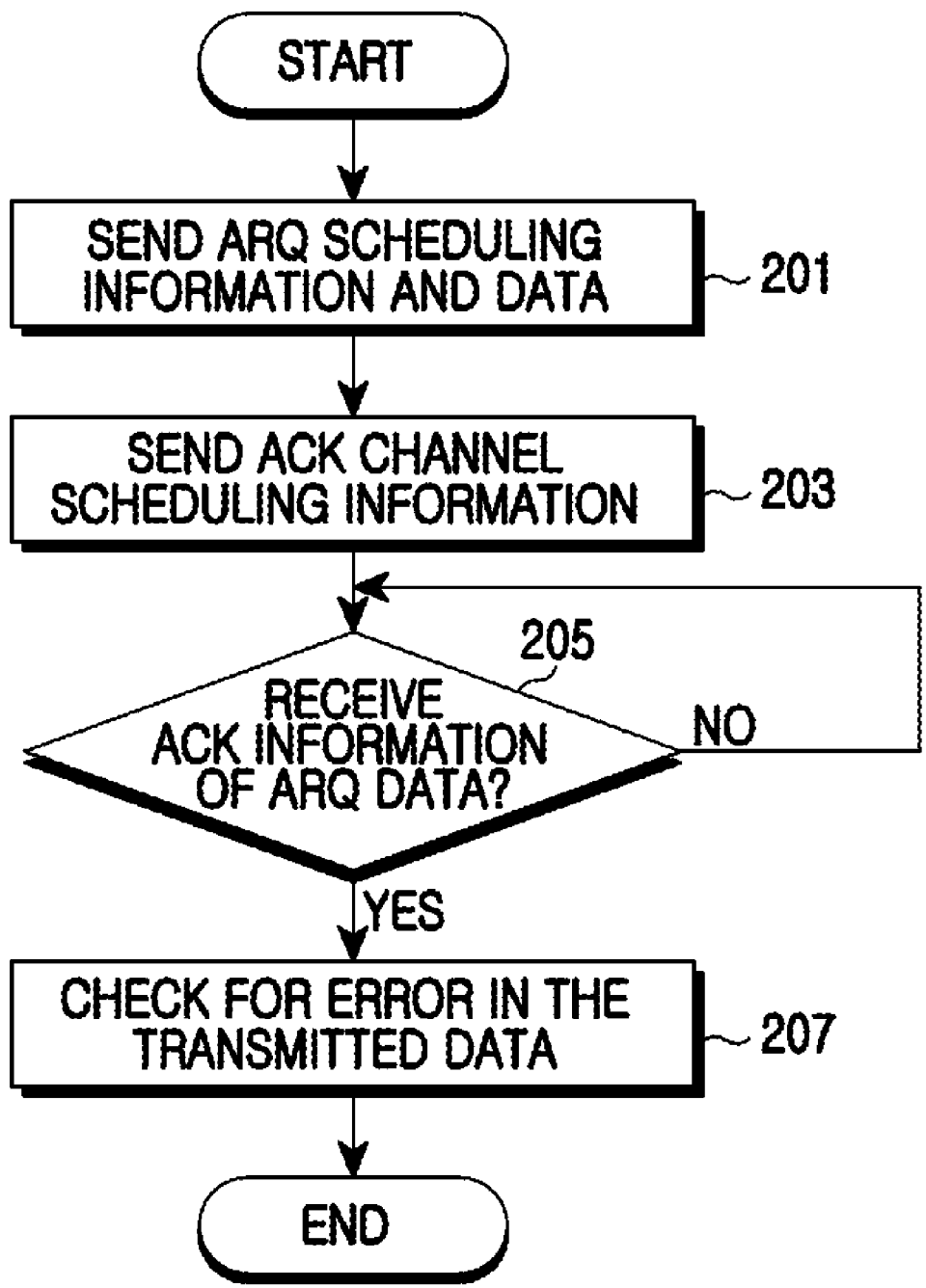
FIG. 2 illustrates a method for a Base Station (BS) to allocate a region for an ACK channel in a wireless relay communication system according to an exemplary embodiment of the present invention.

FIG. 2 is a flowchart outlining a method for a BS to allocate a region for an ACK channel in a wireless relay communication system according to an exemplary embodiment of the present invention.

In step 201, the BS transmits ARQ scheduling information and data to the RS. For example, the BS transmits a MAP including ARQ scheduling information and data to the RS.

In step 203, the BS transmits scheduling information of the ACK channel to the lower RS. For example, the BS transmits the scheduling information of the ACK channel to the lower RS using the ACK allocation IE of the uplink map as defined in the IEEE 802.16 standard. Herein, the scheduling information of the ACK channel includes the allocation information of the ACK channel region for the data scheduled by the BS and the allocation information of the ACK channel region for the retransmission data arbitrarily transmitted by the lower RS without the scheduling of the upper node.

In step 205, the BS determines whether ACK information for the data sent to the lower RS is received over the ACK channel allocated by the lower RS.

When receiving the ACK information, the BS checks for error in the transmitted data using the ACK information received from the lower RS in step 207. From the ACK information, the BS can confirm not only the ACK information of the data scheduled by the BS but also the ACK information of the retransmission data arbitrarily transmitted by the lower RS without the scheduling of the upper node. Also, the BS can acquire the plurality of ACK information in the ACK channel received from the lower RS according to a preset ACK channel configuration scheme.

Next, the BS finishes the process.

Figure 3:
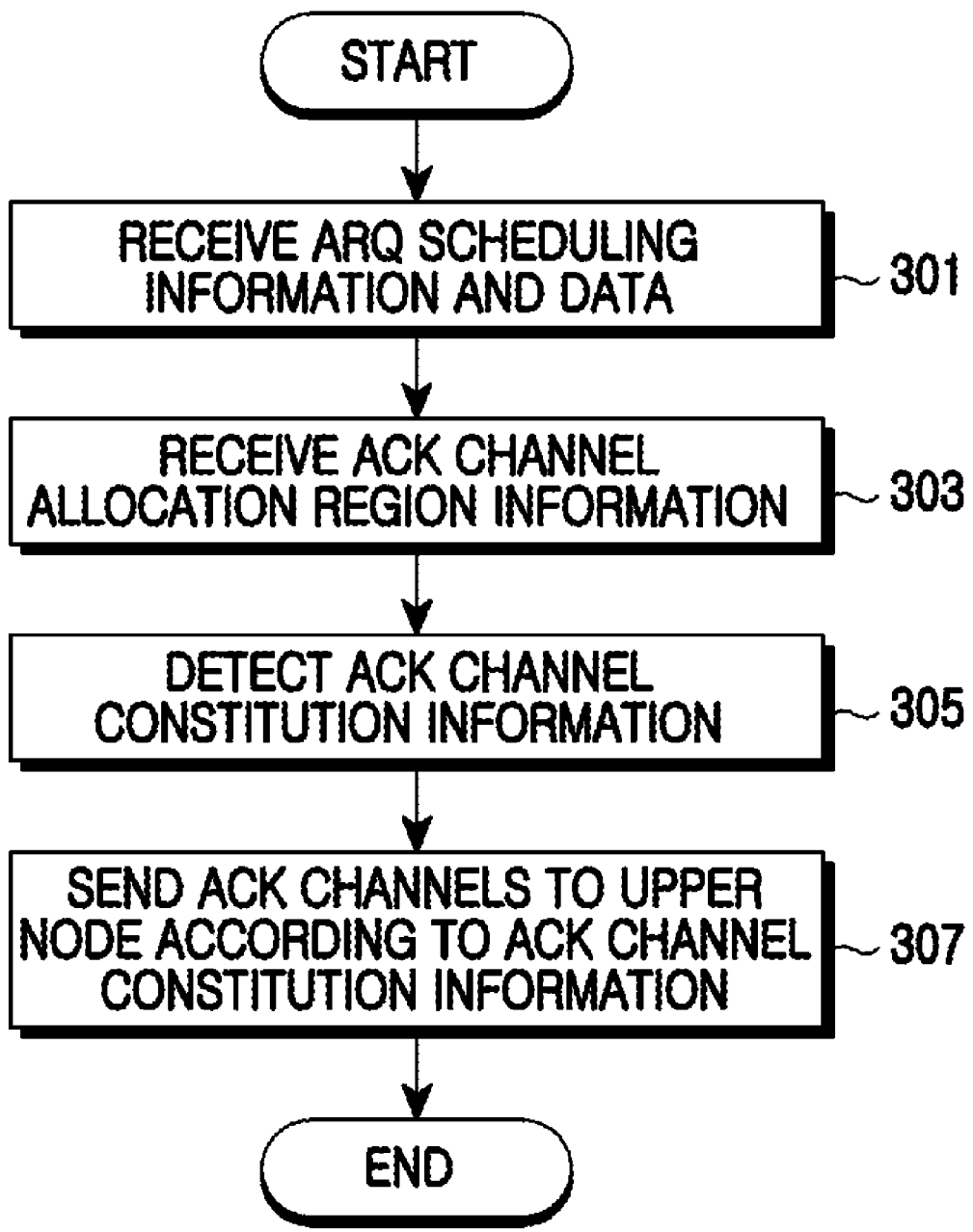
FIG. 3 illustrates a method for a Relay Station (RS) to transmit an ACK channel in a wireless relay communication system according to an exemplary embodiment of the present invention.

As state above, when the BS allocates the ACK channels, the RS sends the ACK channel to the BS as illustrated in FIG. 3.

FIG. 3 is a flowchart outlining a method for an RS to transmit an ACK channel in a wireless relay communication system according to an exemplary embodiment of the present invention.

In step 301, the RS receives the ARQ scheduling information and the data from the upper node. For example, according to the IEEE 802.16 standard, the RS detects the ARQ scheduling information from a Hybrid ARQ (HARQ) downlink MAP received from the upper node.

In step 303, the RS receives the ACK channel allocation region information from the upper node. For example, according to the IEEE 802.16 standard, the RS detects the scheduling information of the ACK channel included in the ACK allocation IE of the uplink MAP received from the upper node. Based on the scheduling information of the ACK channels, the RS detects the ACK channel region for the data provided from the upper node and the ACK channel region for the retransmission data sent to the lower node without the scheduling of the upper node.

In step 305, the RS detects the preset ACK channel constitution information. That is, the RS detects the ACK channel constitution information for transmitting the multiple ACK channels to the upper node.

In step 307, the RS configures the ACK channels in sequence according to the ACK channel constitution information. The RS separates the ACK channels for the data scheduled by the upper node and the ACK channels for the retransmission data not scheduled by the upper node as illustrated in channel arrangement C or D in FIG. 5.

When the ACK channel transmission time detected in the ARQ scheduling information arrives, the RS transmits the constituted ACK channels to the upper node.

Next, the RS finishes the process.

The RS, which transmits the ACK channels according to the ACK channel allocation information provided from the upper node as described above, may be constructed as illustrated in FIG. 4.

Figure 4:
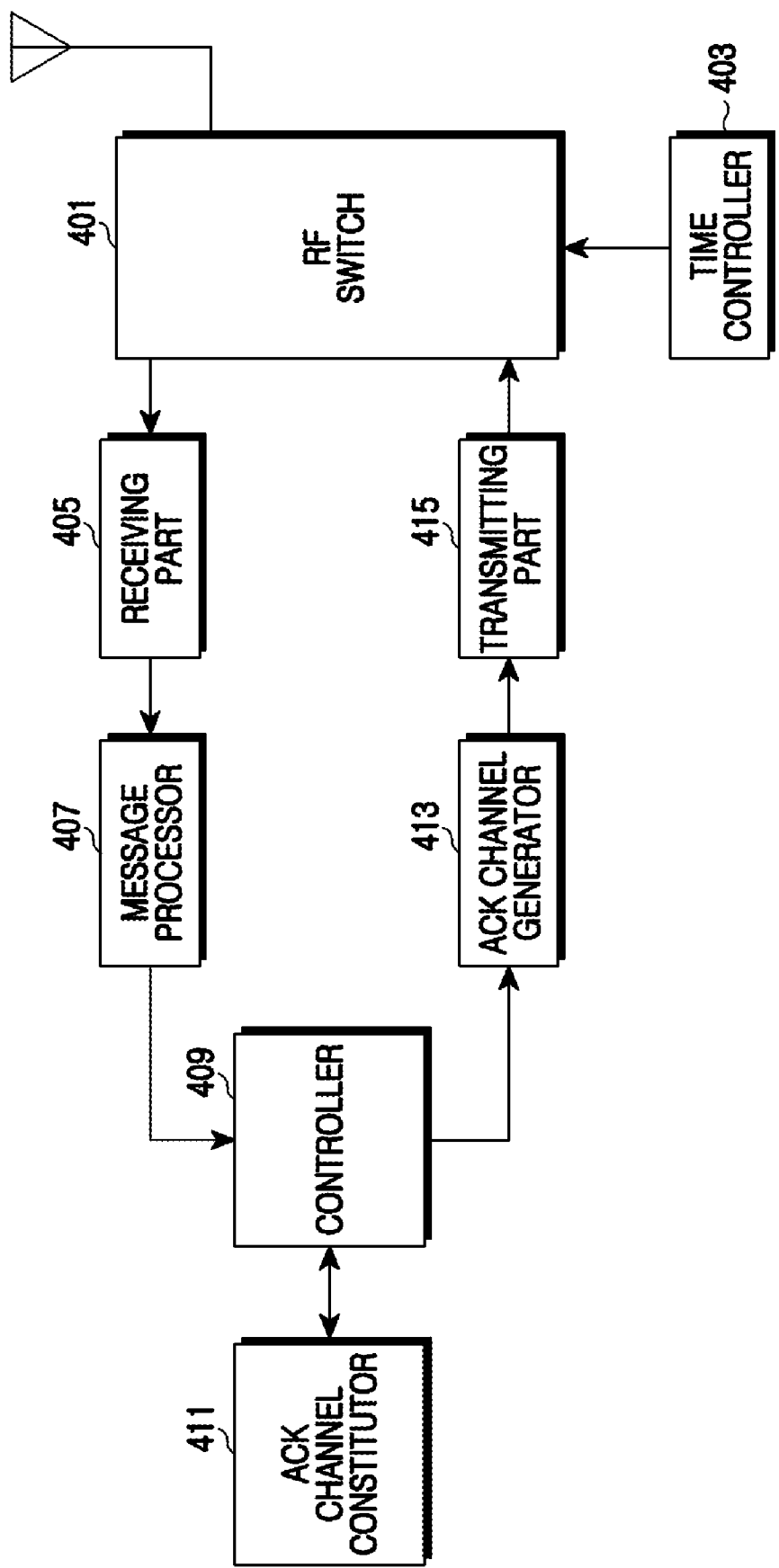
FIG. 4 illustrates an RS for transmitting an ACK channel in a wireless relay communication system according to an exemplary embodiment of the present invention.

FIG. 4 is a block diagram of an RS for transmitting an ACK channel in a wireless relay communication system according to an exemplary embodiment of the present invention. Herein, although the wireless communication system adopts Time Division Duplex (TDD) scheme, other communication systems can be employed.

The RS of FIG. 4 includes a Radio Frequency (RF) switch 401, a time controller 403, a receiving part 405, a message processor 407, a controller 409, an ACK channel constitutor 411, an ACK channel generator 413, and a transmitting part 415.

The time controller 403 controls a switching operation of the RF switch 401 based on frame synchronization. For example, during signal reception, the time controller 403 controls the RS switch 401 to interconnect an antenna and the receiving part 405. During signal transmission, the time controller 403 controls the RF switch 401 to interconnect the antenna and the transmitting part 415.

During signal reception, the receiving part 405 restores data from the signal output from the RF switch 401 and provides the restored data to the message processor 407. For example, the receiving part 405 can include one or more of an RF reception block, a demodulation block, and a channel decoding block (each of which are not illustrated). The RF reception block includes one or more of a filter and an RF pre-processor (each of which are not illustrated) and converts an RF signal into a baseband signal. The demodulation block includes a Fast Fourier Transform (FFT) operator for extracting data in each subcarrier. The channel decoding block includes a demodulator, a deinterleaver, and a channel decoder.

The message processor 407 detects the control signal from the data output from the receiving part 405 and provides the detected control signal to the controller 409.

The controller 409 detects the ARQ scheduling information and the ACK information of the lower nodes based on the control signal output from the message processor 407. The controller 409 provides the ACK channel generator 413 with the ACK information of the lower nodes and the ACK channel constitution information output from the ACK channel constitutor 411.

The ACK channel constitutor 411 contains the preset ACK channel constitution information. For example, the ACK channel constitutor 411 contains the information of the ACK channel region for the data scheduled by the upper node and the ACK channel region for the retransmission data not scheduled by the upper node. The ACK channel constitutor 411 contains constitution information for configuring the ACK channels in order.

The ACK channel generator 413 constitutes the ACK channels for the ACK information received from the lower nodes according to the ACK channel constitution scheme fed from the controller 409. The ACK channel generator 413 arranges the ACK channels to distinguish the ACK information of the data scheduled by the upper node and the ACK information of the retransmission data sent to the lower node without the scheduling of the upper node. For example, in the first RS 110 illustrated in FIG. 1, the ACK channel generator 413 sequentially arranges the ACK channels for carrying the ACK information for the first data, the second data, and the third data scheduled by the upper node as illustrated in channel arrangement B in FIG. 5. The ACK channel generator 413 sequentially arranges the ACK channels for carrying the ACK information of the first retransmission data and the second retransmission data not scheduled by the upper node as illustrated in channel arrangement F in FIG. 5. The ACK channel generator 413 arranges the ACK channels to distinguish the ACK channels for the data scheduled by the upper node and the ACK channels for the retransmission data not scheduled by the upper node as illustrated in channel arrangement C in FIG. 5.

The transmitting part 415 sends the multiple ACK channels arranged by the ACK channel generator 413, to the upper node over a physical channel for delivering the ACK information allocated by the upper node.

In this exemplary embodiment of the present invention, the controller 409 provides the ACK channel generator 413 with the ACK information from the lower nodes and the ACK channel constitution information from the ACK channel constitutor 411. Alternatively, the ACK channel generator 413 can arrange the ACK information from the lower nodes, which are output from the controller 409, in an order according to the ACK channel constitution information provided directly from the ACK channel constitutor 411.

As set forth above, the RS of the wireless relay communication system distinguishes the ACK channel for the data scheduled by the upper node and the ACK channel for the retransmission data not scheduled by the upper node, arranges the plurality of the ACK channels in an order according to the ACK channel scheduling information provided from the upper node, and transmits the ACK channels to the upper node. Therefore, the upper node can easily detect the multiple ACK channels.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting ACKnowledge (ACK) channels by a Relay Station (RS) in a wireless communication system, the method comprising:
   when receiving one or more ACK information from one or more lower nodes, checking ACK channel constitution information provided from an upper node;
   identifying an ACK channels region corresponding ACK information using the ACK channel constitution information; and
   transmitting the one or more ACK information to the upper node in the ACK channel region,
   wherein the ACK channel region includes a first sub-region comprising first ACK information corresponding to a first data transmitted from the upper node to the RS and a second sub-region comprising second ACK information corresponding to a second data retransmitted from the RS to the one or more lower nodes, and
   wherein the ACK information includes one of ACK message and NACK message.

2. The method of claim 1, wherein the lower node comprises at least one of a Mobile Station (MS) and a lower RS, and the upper node comprises at least one of a Base Station (BS) and an upper RS.

3. The method of claim 1, wherein the checking of the ACK channel constitution information comprises:
   determining the ACK channel constitution information preset through a communication with the upper node in a system configuration or determining the ACK channel constitution information using a control signal received from the upper node.

4. The method of claim 1, wherein the ACK channel constitution information comprises information relating to the first sub-region for allocating the ACK channels to the one or more data transmitted from the upper node to the RS, and information relating to the second sub-region for allocating ACK channels to one or more retransmission data retransmitted from the RS to the one or more lower node.

5. The method of claim 4, wherein the ACK channel constitution information comprises arrangement information of one or more ACK channels to be allocated in at least one of the first ACK channel region and the second ACK channel region.

6. The method of claim 5, wherein the arrangement information of the ACK channels in the first ACK channel region is determined by considering at least one of a reception order of scheduling information of data carrying the ACK information and the number of hops to a lower node that originally sent ACK information corresponding to the transmitted data.

7. The method of claim 5, wherein the arrangement of the ACK channels in the second ACK channel region is determined by considering at least one of a type of a lower node that sends the ACK information corresponding to the transmitted data and a reception order of the ACK information.

8. The method of claim 1, further comprising:
   detecting scheduling information provided from the upper node;
   transmitting data to the one ore more lower nodes according to the scheduling information; and
   determining whether ACK information is received in response to the data transmitted to the lower nodes.

9. The method of claim 8, further comprising:
   when one or more lower nodes request a retransmission, transmitting retransmission data to the lower nodes; and
   determining whether ACK information is received in response to the retransmission data to the lower nodes.

10. The method of claim 1, wherein the transmitting of the ACK information to the upper node comprises:
    when an ACK information transmission time determined by the upper node arrives, transmitting ACK information to the upper node over the ACK channel region.

11. The method of claim 1, wherein the second sub-region further comprises third ACK information corresponding to a third data retransmitted from a lower RS.

12. An apparatus for a Relay Station (RS) in a wireless communication system, the apparatus comprising:
    a receiving part for receiving a signal;
    an ACKnowledge (ACK) channel constitutor for, when receiving one or more ACK information from one or more lower nodes through the receiving part, detecting ACK channel constitution information provided from an upper node; and
    a transmitting part for identifying an ACK channel region corresponding ACK information using the ACK channel constitution information, and for transmitting the one or more ACK information to the upper node in the ACK channel region,
    wherein the ACK channel region includes a first sub-region comprising first ACK information corresponding to a first data transmitted from the upper node to the RS and a second sub-region comprising second ACK information corresponding to a second data retransmitted from the RS to the one or more lower nodes, and
    wherein the ACK information includes one of ACK message and NACK message.

13. The apparatus of claim 12, wherein the lower node comprises at least one of a Mobile Station (MS) and a lower RS, and the upper node comprises at least one of a Base Station (BS) and an upper RS.

14. The apparatus of claim 12, wherein the ACK channel constitutor detects the ACK channel constitution information preset through communication with the upper node in a system configuration or detects the ACK channel constitution information using a control signal received from the upper node.

15. The apparatus of claim 12, wherein the ACK channel constitutor detects ACK channel constitution information that comprises information relating to the first sub-region for allocating the ACK channels to the one or more data transmitted from the upper node to the RS, and information relating to the second sub-region for allocating ACK channels to one or more retransmission data retransmitted from the RS to the one or more lower node.

16. The apparatus of claim 15, wherein the ACK channel constitutor detects ACK channel constitution information that comprises arrangement information of one or more ACK channels to be allocated into at least one of the first ACK channel region and the second ACK channel region.

17. The apparatus of claim 16, wherein the ACK channel constitutor confirms the arrangement information of the ACK channels in the first ACK channel region determined by at least one of considering a reception order of scheduling information of data carrying the ACK information and the number of hops to a lower node that originally sent ACK information corresponding to the transmitted data.

18. The apparatus of claim 16, wherein the ACK channel constitutor detects the arrangement information of the ACK channels in the second ACK channel region determined by at least one of considering a type of a lower node that sends ACK information corresponding to the transmitted data and a reception order of the ACK information.

19. The apparatus of claim 12, wherein the transmitting part comprises:
   an ACK channel generator for identifying the ACK channel region to transmit the one or more ACK information according to the ACK channel constitution information; and
   a transmitter for, when an ACK information transmission time determined by the upper node arrives, transmitting the one or more ACK information to the upper node over the ACK channel region.

20. The apparatus of claim 12, wherein the transmitting part transmits data to the one or more lower nodes according to the scheduling information, and
   when one or more lower nodes request a retransmission, the transmitting part sends the retransmission data to the lower nodes.

21. The apparatus of claim 20, wherein the receiving part receives ACK information of the data and the retransmission data sent to the lower nodes.

22. The apparatus of claim 12, wherein the second sub-region further comprises third ACK information corresponding to a third data retransmitted from a lower RS.

* * * * *